(12) United States Patent
Diaz et al.

(10) Patent No.: US 6,184,657 B1
(45) Date of Patent: *Feb. 6, 2001

(54) BATTERY CHARGER HAVING CURRENT INCREASING CIRCUIT

(75) Inventors: Jose R. Diaz, Chicago; George R. Gawell, Buffalo Grove; Neal R. McCurdy, Highland Park, all of IL (US)

(73) Assignee: S-B Power Tool Company, Chicago, IL (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/374,019

(22) Filed: Aug. 13, 1999

(51) Int. Cl.[7] .......................................................... H02J 7/00
(52) U.S. Cl. ............................................. 320/128; 320/166
(58) Field of Search ..................................... 320/116, 125, 320/127, 128, 166, 167

(56) References Cited

U.S. PATENT DOCUMENTS

| 3,046,466 | 7/1962 | Tyrrell et al. . |
|---|---|---|
| 4,167,036 | 9/1979 | Kenney . |
| 4,387,333 | 6/1983 | St. Ledger . |
| 4,417,198 | * 11/1983 | Mayfield ............................... 323/315 |
| 4,855,891 | 8/1989 | Paul . |
| 5,204,608 | * 4/1993 | Koenck . |
| 5,528,122 | * 6/1996 | Sullivan et al. . |
| 5,552,692 | 9/1996 | McKillop . |
| 5,675,232 | * 10/1997 | Koenck . |

* cited by examiner

Primary Examiner—Edward H. Tso
(74) Attorney, Agent, or Firm—Greer, Burns & Crain, Ltd.

(57) ABSTRACT

A battery charger is adapted to increase a charge current applied to at least one battery from a predetermined supply voltage. The charger includes a supply voltage generating device coupled to an AC voltage source for generating the predetermined supply voltage and a charging circuit electrically connected to the supply voltage generating device. The charging circuit includes a first capacitor and a second capacitor AC coupled to the first capacitor. The charging circuit is adapted to apply the charge current from the supply voltage generating device to the at least one battery through the first capacitor during a first half of a charging cycle, and store the charge current from the supply voltage generating device in the second capacitor during a second half of the charging cycle. The stored charge energy is then applied to the at least one battery during the first half of the charging cycle to increase the total charge current being applied to the at least one battery during the first half of the charging cycle.

20 Claims, 1 Drawing Sheet

BATTERY CHARGER HAVING CURRENT INCREASING CIRCUIT

Figure 1:
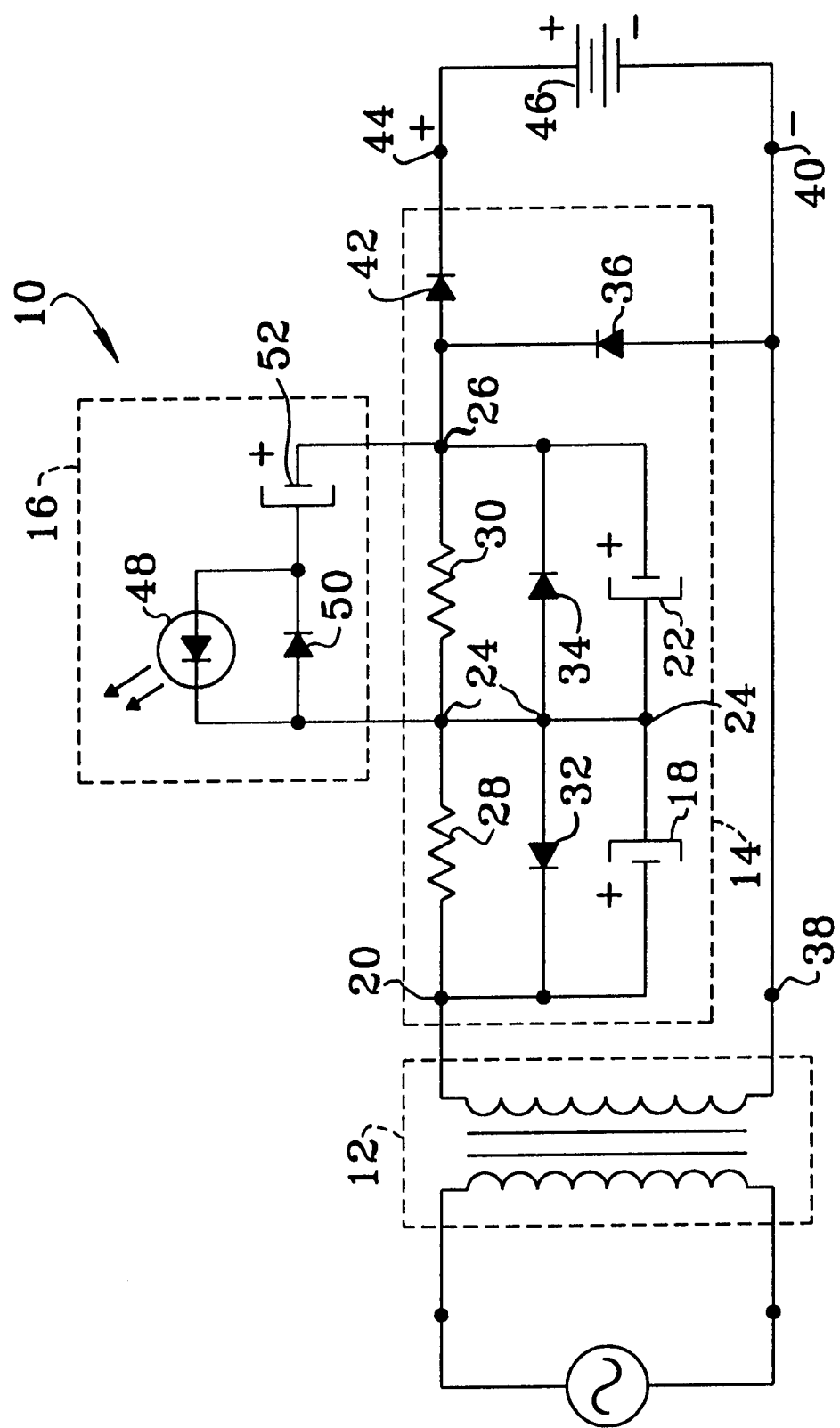

The present invention generally relates to battery chargers, and more particularly to a battery charger which is adapted to increase the charge current to a battery without increasing the power supply to the battery charger.

Battery chargers which increase the charge current to the battery without increasing the power supply of the charger itself is known in the art. One such known battery charger includes an AC power supply which delivers a charge current directly to the battery via a forward biased diode during a positive half of the charge cycle. In the negative half cycle, however, the charge current is routed through a second diode and stored in a capacitor. The stored energy is then released to the battery along with the charge current from the power supply during the next positive half cycle, thereby increasing the total charge current to the battery.

These types of battery chargers, however, have poor current regulation, especially when charging batteries with different voltages, i.e., the charge current fluctuates significantly when a battery having a lower voltage is switched to one that has a relatively higher voltage, for example. Additionally, the battery chargers of the type described above do not protect the power supply from a short circuit across the output of the battery charger.

Accordingly, it is a primary objective of the present invention to provide an improved battery charger for increasing the charge current to the battery from a predetermined power supply.

Another object of the present invention is to provide such a battery charger having improved current regulation.

Still another object of the present invention is to provide such an improved battery charger which offers a better short circuit protection for the power supply.

Yet another object of the present invention is to provide such an improved battery charger having a pair of capacitors AC coupled to each other.

A related object of the present invention is to provide such an improved battery charger including an indicator which is activated when the battery is being charged.

A further object of the present invention is to provide such an improved battery charger including a transformer for supplying the charge energy.

Other objects and advantages will become apparent upon reading the following detailed description, in conjunction with the attached drawing, in which:

FIG. 1 is a detailed schematic diagram of the circuitry of an embodiment of the present invention.

DETAILED DESCRIPTION

The present invention is directed to a battery charger which is adapted to increase the charge current to the battery or batteries without increasing the output power of the power supply. To this end, the battery charger stores the charge current from the power supply into a storage device during the negative half of a charging cycle, and then releases the stored energy to the battery, together with the charge current supplied from the power supply, during a positive half cycle. The battery charger includes a pair of capacitors which are AC coupled to protect the power supply from a short across the output of the charger. Also included in the battery charger is a charge indicator which illuminates when the battery(s) is being charged.

Broadly stated, the present invention is directed to a battery charger which is adapted to increase a charge current applied to at least one battery from a predetermined supply voltage. The charger includes a supply voltage generating device coupled to an AC voltage source for generating the predetermined supply voltage and a charging circuit electrically connected to the supply voltage generating device. The charging circuit includes a first capacitor and a second capacitor AC coupled to the first capacitor. The charging circuit is adapted to apply the charge current from the supply voltage generating device to the at least one battery through the first capacitor during a first half of a charging cycle, and store the charge current from the supply voltage generating device in the second capacitor during a second half of the charging cycle. The stored charge current is then applied to the at least one battery during the first half of the charging cycle to increase the total charge current being applied to the at least one battery during the first half of the charging cycle.

In accordance with another embodiment, the present invention includes a battery charger having a short circuit protection circuit. The battery charger includes a power transformer coupled to an AC voltage source for generating a predetermined supply voltage for charging at least one battery and a charging circuit electrically connected to the transformer. The charging circuit includes a first capacitor and a second capacitor AC coupled to the first capacitor. The first capacitor is operatively connected in the charging circuit to block a DC current to the transformer when a short occurs across an output of the battery charger during the first half of a charging cycle, and the second capacitor is operatively connected in the charging circuit to block a DC current to the transformer when a short occurs across the output of the battery charger during the second half of the charging cycle.

Turning now to FIG. 1, the circuitry of the present battery charger is indicated generally at 10 and includes a transformer 12, a charge circuit 14 and a charge indicator circuit 16. The transformer 12 is a step-down type for reducing an AC line voltage into a lower value AC voltage appropriate for charging batteries.

The charge circuit 14 includes a capacitor 18 having its positive side connected to an output terminal 20 of the transformer 12 and its negative side connected to the negative side of a capacitor 22 at a node 24. The positive side of the capacitor 22 is connected to a node 26. A pair of resistors 28, 30 are series connected at the node 24 and respectively to the terminal 20 and the node 26. Also connected to the node 24 are the respective anodes of a pair of diodes 32, 34. The cathode of the diode 32 is connected to the output terminal 20 and that of the diode 34 to the node 26.

Also included in the charge circuit 14 is a diode 36 which has its cathode connected to the node 26 and its anode electrically connect to an output terminal 38 of the transformer 12 and to a negative output terminal 40 of the battery charger 10. A diode 42 is also connected to the node 26 at its anode and its cathode connected to a positive output terminal 44 of the battery charger 10. The output terminals 44, 40 are adapted to be connected to a battery or a plurality of batteries 46 which require charging.

The charge indicator circuit 16 includes an LED 48 which illuminates to indicate that the battery 46 is being charged. Also included in the charge indicator circuit 16 is a diode 50 connected in parallel to the LED 48 to protect the LED from excessive reverse voltage, and a capacitor 52 connected between the LED 48 and the node 26 to provide an AC current path to the LED.

In operation, the current path from the transformer 12 to the battery 46 is respectively through the capacitor 32, the diode 34 and the diode 42 during the positive half cycle of the charge period. In the negative half cycle, the current path is from the transformer 12 through the diode 36, the capacitor 22 and the diode 32, respectively. During the negative half cycle, the capacitor 22 charges to a near peak voltage output by the transformer 12, minus the approximately 0.7 V forward drop across each of the diode 32 and the diode 36. Thus, at approximately 0.7 V past the negative peak voltage, the diodes 32, 36 become reverse biased because of the charge on the capacitor 22. It should be noted that the capacitor 22 discharges very slowly through the battery 46. Thus, the voltage across the capacitor 22 discharges little from one charge cycle to the next. In effect, the voltage across the capacitor 22 acts as a battery in series with the output voltage of the transformer 12, resulting in the clamping of the negative voltage to 0.7 V (across the diode 36) during the negative cycle, and raising the positive voltage to twice (across the diode 36) during the negative cycle, and raising the positive voltage to twice the peak voltage of the transformer, minus the 1.4 V drop across the diodes 32, 36 during the positive cycle. With the increase in the output voltage, the output current to the battery 46 is increased correspondingly. Thus, a sufficient charge current is available to meet the current requirements of the batteries having different voltages without significant fluctuations in the charge current.

Those of ordinary skill in the art will recognize that the two capacitors 18, 22 are AC coupled, i.e., the negative sides of the two capacitor are electrically connected to each other. The AC coupled capacitors 18, 22 limit DC current to the transformer 12 in the event of a short across the output of the battery charger 10, thereby protecting the transformer. More specifically, the capacitor 18 limits the DC current if a short occurs during the positive charge cycle, and the capacitor 22 during the negative charge cycle. It should be noted, however, that the capacitor 22 serves mainly as a secondary protective device, since the diode 42 would be reversed biased and block the short circuit current during the negative charge cycle. Further, the capacitors 18, 22 are connected in parallel respectively with the resistor 28 and the resistor 30 which discharge the capacitors when the battery charger 10 is turned off.

In accordance with another aspect of the present invention, the LED 48 of the charge indicator circuit 16 is energized during the negative half of the charge cycle, during which the current path is from the transformer 12 through the diode 36, the capacitor 52, the LED 48 the diode 32 and back to the transformer. The diode 50, as indicated above, protects the LED 48 from excessive reverse voltage. Thus, the LED 48 is illuminated only when the charge circuit 14 is charging the battery 46.

From the foregoing description, it should be understood that an improved battery charger has been shown and described which has many desirable attributes and advantages. It increases the voltage and current applied to the battery without increasing the power supply and also better regulates the charge current for multiple battery voltages. Further, the present battery charger protects the power transformer in the event of a short across the output of the charger.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A battery charger adapted to increase a charge current applied to at least one battery from a predetermined supply voltage, comprising:

supply voltage generating means coupled to an AC voltage source for generating the predetermined supply voltage; and a charging circuit electrically connected to said supply voltage generating means and including a first capacitor and a second capacitor AC coupled to the first capacitor, said charging circuit being adapted to apply the charge current from said supply voltage generating means to the at least one battery through said first capacitor during a first half of a charging cycle, and store the charge current from said supply voltage generating means in said second capacitor during a second half of said charging cycle and apply the charge current to the at least one battery during the first half of the charging cycle, to increase the charge current applied to the at least one battery during said first half of said charging cycle.

2. The battery charger as defined in claim 1 wherein said supply voltage generating means is an AC transformer for reducing a voltage from said AC voltage source to the predetermined supply voltage.

3. The battery charger as defined in claim 1 wherein said charging circuit further includes a first diode connected in series with said first capacitor and in parallel to said second capacitor, said first diode being forward biased during said first half of said charging cycle.

4. The battery charger as defined in claim 3 wherein said charging circuit further includes a second diode connected in series with said second capacitor and in parallel to said first capacitor, and a third diode connected in series between said supply supply voltage generating means and said second capacitor, said second diode and said third diode being forward biased during said second half of said charging cycle.

5. The battery charger as defined in claim 4 wherein said charging circuit further includes a fourth diode connected to an output of said battery charger and to said first diode and said second capacitor, said fourth diode being forward biased during said first half of said charging cycle.

6. The battery charger as defined in claim 5 wherein a path of the charge current from said supply voltage generating means is respectively through said first capacitor, said first diode, and said fourth diode during said first half of said charging cycle, and respectively through said third diode, said second capacitor and said second diode during said second half of said charging cycle.

7. The battery charger as defined in claim 6 wherein said first capacitor blocks DC current to said supply voltage generating means when a short circuit occurs across said output of said battery charger during said first half of said charging cycle, and said second capacitor is adapted to block said DC current to said supply voltage generating means when a short circuit occurs across said output of said battery charger during said second half of said charging cycle.

8. The battery charger as defined in claim 1 wherein said charging circuit further includes a first resistor connected in parallel with said first capacitor and a second resistor connected in parallel with said second capacitor, said first and said second resistors being adapted to respectively discharge said first and said second capacitors when said charging circuit is de-energized.

9. The battery charger as defined in claim 1 further comprising charge indicating means which is activated when the at least one battery is being charged.

10. The battery charger as defined in claim 9 wherein said charge indicating means includes a LED which illuminates when the battery is being charged.

11. The battery charger as defined in claim 10 wherein said charge indicating means further includes a capacitor connected in series with said LED and a protective diode connected in parallel with said LED to protect said LED from a reverse voltage.

12. A battery charger having short circuit protection circuit, comprising:
   a power transformer coupled to an AC voltage source for generating a predetermined supply voltage for charging at least one battery; and
   a charging circuit electrically connected to said transformer and including a first capacitor and a second capacitor AC coupled to the first capacitor, said first capacitor being operatively connected in said charging circuit to block DC current to said transformer when a short occurs across an output of said battery charger during a first half of a charging cycle, and said second capacitor being operatively connected in said charging circuit to block DC current to said transformer when a short occurs across an output of said battery charger during a second half of said charging cycle.

13. The battery charger as defined in claim 1 wherein said charging circuit further includes a first diode connected in series with said first capacitor and in parallel to said second capacitor, said first diode being forward biased during said first half of said charging cycle.

14. The battery charger as defined in claim 13 wherein said charging circuit further includes a second diode connected in series with said second capacitor and in parallel to said first capacitor, and a third diode connected between said transformer and said second capacitor, said second and said third diode being forward biased during said second half of said charging cycle.

15. The battery charger as defined in claim 14 wherein said charging circuit further includes a fourth diode connected to an output of said battery charger and to said first diode and said second capacitor, said fourth diode being forward biased during said first half of said charging cycle.

16. The battery charger as defined in claim 15 wherein a path of the charge current from said supply voltage generating means is respectively through said first capacitor, said first diode, and said fourth diode during said first half of said charging cycle, and respectively through said third diode, said second capacitor and said second diode during said second half of said charging cycle.

17. The battery charger as defined in claim 12 wherein said charging circuit further includes a first resistor connected in parallel with said first capacitor and a second resistor connected in parallel with said second capacitor, said first and said second resistors being adapted to respectively discharge said first and said second capacitors when said charger circuit is de-energized.

18. The battery charger as defined in claim 12 further comprising charge indicating means which is activated when the at least one battery is being charged.

19. A battery charger adapted to increase a charge current applied to at least one battery from a predetermined supply voltage, comprising:
   a power transformer coupled to an AC voltage source for generating the predetermined supply voltage; and
   a charging circuit electrically connected to said transformer and including a first capacitor and a second capacitor AC coupled to the first capacitor, said charging circuit being adapted to apply the charge current from said transformer to the at least one battery through said first capacitor during a first half of a charging cycle, and store the charge current from said supply voltage generating means in said second capacitor during a second half of said charging cycle and apply the charge current to the at least one battery during the first half of said charging cycle to increase the charge current applied to the at least one battery during said first half of said charging cycle;
   said first capacitor being operatively connected in said charging circuit to block DC current to said supply voltage generating means when a short occurs across an output of said battery charger during said first half of said charging cycle, and said second capacitor being operatively connected in said charging circuit to block said DC current to said supply voltage generating means when a short occurs across an output of said battery charger during said second half of said charging cycle.

20. The battery charger as defined in claim 19 further comprising charge indicating means which is activated when the at least one battery is being charged.

\* \* \* \* \*

UNITED STATES PATENT AND TRADEMARK OFFICE
CERTIFICATE OF CORRECTION

| | |
|---|---|
| PATENT NO. | : 6,184,657 B1 |
| DATED | : February 6, 2001 |
| INVENTOR(S) | : Diaz et al. |

It is certified that error appears in the above-identified patent and that said Letters Patent is hereby corrected as shown below:

<u>Column 4,</u>
Line 34, delete "supply" (first occurrence).

Signed and Sealed this

Sixteenth Day of April, 2002

Attest:

JAMES E. ROGAN
*Attesting Officer*     *Director of the United States Patent and Trademark Office*